(12) United States Patent
Ido et al.

(10) Patent No.: US 8,197,767 B2
(45) Date of Patent: Jun. 12, 2012

(54) HONEYCOMB STRUCTURE

(75) Inventors: Takahiko Ido, Gifu (JP); Chizuru Kasai, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 104 days.

(21) Appl. No.: 12/711,206

(22) Filed: Feb. 23, 2010

(65) Prior Publication Data

US 2010/0247398 A1 Sep. 30, 2010

(30) Foreign Application Priority Data

Mar. 31, 2009 (EP) .................................... 09004719

(51) Int. Cl.
*B01D 50/00* (2006.01)
(52) U.S. Cl. ....................................... 422/180; 422/177
(58) Field of Classification Search .................. 422/168, 422/177, 180
See application file for complete search history.

(56) References Cited

U.S. PATENT DOCUMENTS

| 2002/0039966 A1 | 4/2002 | Tanaka et al. |
| 2002/0077248 A1 | 6/2002 | Nakanishi et al. |

FOREIGN PATENT DOCUMENTS

| EP | 1649924 | 4/2006 |
| EP | 1717218 | 11/2006 |
| JP | 52-039709 | 3/1977 |
| JP | 03-065306 | 3/1991 |
| JP | 6-58138 | 3/1994 |
| JP | 2003-112048 | 4/2003 |
| JP | 2006-116431 | 5/2006 |
| WO | WO 2005/063653 | 7/2005 |
| WO | WO 2009/118871 | 10/2009 |
| WO | WO 2009/118872 | 10/2009 |

OTHER PUBLICATIONS

Japanese Office Action for corresponding JP Application No. 2010-071566, Nov. 22, 2011.

*Primary Examiner* — Tom Duong
(74) *Attorney, Agent, or Firm* — Ditthavong Mori & Steiner, P.C.

(57) ABSTRACT

A disclosed honeycomb structure includes at least one honeycomb unit having parallel through holes separated by partition walls and extending in the longitudinal direction, the honeycomb unit including a first SOx-occluding agent, first inorganic particles, and an inorganic binder; and coating layers formed on the partition walls and including a second SOx-occluding agent and second inorganic particles. In the honeycomb structure, the basicity of the honeycomb unit is higher than that of the coating layers.

21 Claims, 2 Drawing Sheets

HONEYCOMB STRUCTURE

CROSS-REFERENCE TO RELATED APPLICATIONS

The present application claims priority from EP09004719.2 filed on Mar. 31, 2009, the entire contents of which are incorporated herein by reference.

BACKGROUND OF THE INVENTION

1. Field of the Invention

The present invention relates to a honeycomb structure.

2. Description of the Related Art

A honeycomb catalyst for converting automotive exhaust gases comprises a honeycomb structure made of cordierite, a layer formed on the surface of the honeycomb structure and made of a material such as activated alumina having a large specific surface area, and a catalyst such as platinum supported on the layer. And, a honeycomb catalyst for converting exhaust gases emitted from a diesel engine further includes a NOx-occluding agent to treat NOx in an excess oxygen atmosphere.

One problem with such a honeycomb catalyst is that a NOx-occluding agent tends to more stably occlude SOx rather than NOx and to become unable to properly occlude NOx because of SOx poisoning.

Trying to solve this problem, an apparatus disclosed in JP-A-6-58138 comprises a sulfur-capturing device positioned upstream of a NOx-occluding agent in the exhaust gas passage and including a sulfur sorbent and a casing surrounding the sulfur sorbent. An exemplary sulfur sorbent described in JP-A-6-58138 comprises an alumina support carrying a noble metal such as platinum and at least one of an alkali metal such as potassium, sodium, lithium, or cesium, an alkaline earth such as barium or calcium, and a rare earth such as lanthanum or yttrium. WO05/063653 also discloses a honeycomb structure.

The entire contents of JP-A-6-58138 and WO05/063653 are incorporated herein by reference.

SUMMARY OF THE INVENTION

Embodiments of the present invention provide a honeycomb structure that solves or reduces one or more problems caused by the limitations and disadvantages of the related art.

An embodiment of the present invention provides a honeycomb structure that includes at least one honeycomb unit having parallel through holes separated by partition walls and extending in the longitudinal direction, the honeycomb unit including a first SOx-occluding agent, first inorganic particles, and an inorganic binder; and coating layers formed on the partition walls and including a second SOx-occluding agent and second inorganic particles; wherein the basicity of the honeycomb unit is higher than that of the coating layers.

DESCRIPTION OF THE PREFERRED EMBODIMENTS

Preferred embodiments of the present invention are described below with reference to the accompanying drawings.

Figure 1A:
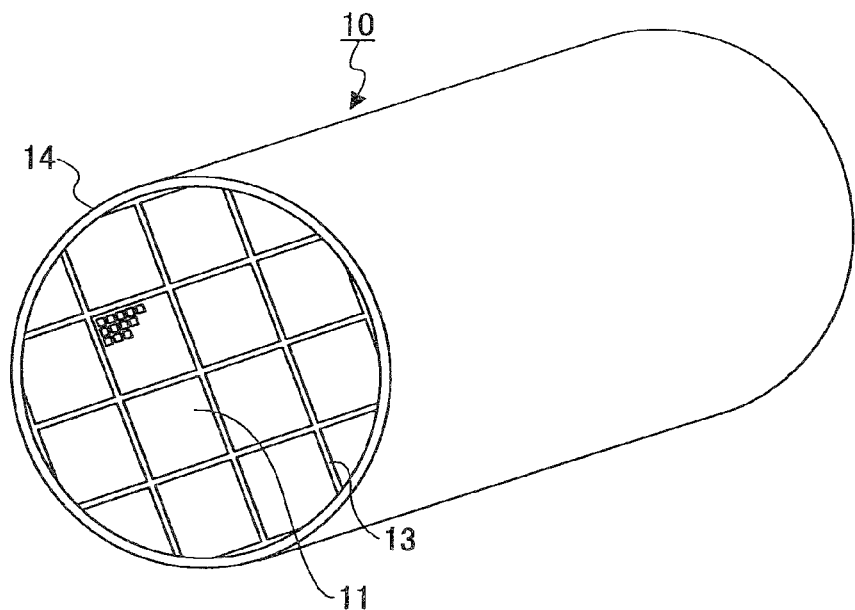
FIG. 1A is a perspective view of a honeycomb structure according to an embodiment of the present invention.
Figure 1B:
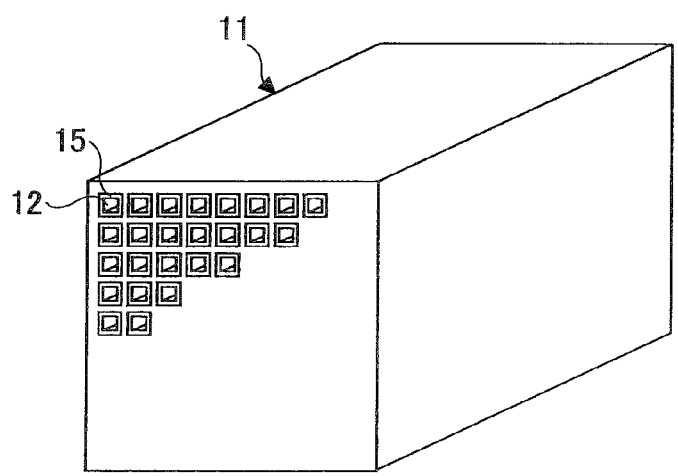
FIG. 1B is a perspective view of a honeycomb unit shown in FIG. 1A.

FIGS. 1A and 1B illustrate a honeycomb structure according to an embodiment of the present invention. A honeycomb structure 10 comprises honeycomb units 11 each having parallel through holes 12 separated by partition walls and extending in the longitudinal direction. The honeycomb units 11 are bonded together by interposing adhesive layers 13 and the outer surface of the bonded honeycomb units 11 is covered by an outer peripheral coating layer 14. Each of the honeycomb units 11 includes a first SOx-occluding agent, first inorganic particles, and an inorganic binder. Coating layers 15 including a second SOx-occluding agent and second inorganic particles are formed on the partition walls. If the SOx-occluding agent is contained only in the partition walls of the honeycomb unit 11 or in the coating layers 15, the amount of SOx-occluding agent per unit volume may be insufficient. The basicity of the honeycomb unit 11 is higher than that of the coating layers 15. This configuration makes it easier to improve the SOx-occluding capability of the honeycomb structure 10. More specifically, the first SOx-occluding agent contained in the honeycomb unit 11 with high basicity exhibits higher SOx-occluding capability than the second SOx-occluding agent contained in the coating layers 15 with low basicity. This configuration makes it easier to effectively use the first SOx-occluding agent. Placing the above honeycomb structure 10 in a position upstream of another honeycomb structure including a NOx-occluding agent with respect to the exhaust gas flow makes it easier to prevent SOx-poisoning of the NOx-occluding agent.

On the other hand, if the basicity of the coating layers 15 is higher than that of the honeycomb unit 11, the SOx-occluding capability of the second SOx-occluding agent becomes higher than that of the first SOx-occluding agent. As a result, when the honeycomb structure 10 is used to occlude SOx, the second SOx-occluding agent first occludes SOx. This in turn makes it difficult for SOx to penetrate into the partition walls and thereby makes it difficult to effectively use the first SOx-occluding agent.

The basicity of the honeycomb unit 11 and the coating layers 15 may be evaluated by measuring the amounts of $CO_2$ desorbed using a temperature programmed desorption (TPD) method. The higher the amount of $CO_2$ desorbed is, the higher the basicity is.

However, such a sulfur-capturing device needs to absorb a large amount of sulfur and therefore tends to become large in size. A honeycomb structure disclosed in WO051063653 may be used to solve this problem. The disclosed honeycomb structure comprises porous honeycomb units each having multiple through holes and including a first inorganic material (e.g., ceramic particles), a second inorganic material (e.g., inorganic fibers or ceramic particles with a large particle diameter), and an inorganic binder. The outer surfaces, where the openings of the through holes are not present, of the porous honeycomb units are joined together by interposing sealant layers. Such a honeycomb structure has a large specific surface area and therefore can be made small in size.

Still, to use such a honeycomb structure to occlude SOx, it is desired to further improve its SOx-occluding capability.

Embodiments of the present invention provide a honeycomb structure with improved SOx-occluding capability.

As the first SOx-occluding agent, any substance that reacts with SOx and occludes SOx as sulfate may be used. For example, alkali metals such as sodium and potassium and alkaline-earth metals such as magnesium, calcium, and barium may be used individually or in combination.

Similarly, as the second SOx-occluding agent, any substance that reacts with SOx and occludes SOx as sulfate may be used. For example, alkali metals such as potassium and alkaline-earth metals such as magnesium and barium may be used individually or in combination.

The first SOx-occluding agent and the second SOx-occluding agent may be composed of the same or different materials.

The honeycomb unit 11 (partition walls) preferably includes about 1.0 to about 2.5 mol/L of the first SOx-occluding agent. If the content of the first SOx-occluding agent is equal to or more than about 1.0 mol/L, it is easier to achieve enough SOx-occluding capability with a small honeycomb unit 11. Meanwhile, if the content of the first SOx-occluding agent is equal to or less than about 2.5 mol/L, it is easier to manufacture the honeycomb unit 11.

As the first inorganic particles, any inorganic compound other than that used for the SOx-occluding agent may be used as long as it can increase the specific surface area of the honeycomb structure 10 to facilitate occlusion of SOx by the first SOx-occluding agent (i.e., to cause a noble metal catalyst to be highly dispersed and thereby to facilitate the oxidation reaction of $SO_2$ to $SO_3$). For example, alumina, zirconia, calcium carbonate, titania, silica, and the like may be used individually or in combination. Among them, alumina is especially preferable.

Similarly, as the second inorganic particles, any inorganic compound other than that used for the SOx-occluding agent may be used as long as it can increase the specific surface area of the honeycomb structure 10 to facilitate occlusion of SOx by the second SOx-occluding agent (i.e., to cause a noble metal catalyst to be highly dispersed and thereby to facilitate the oxidation reaction of $SO_2$ to $SO_3$). For example, alumina, zirconia, calcium carbonate, titania, silica, and the like may be used individually or in combination.

Inorganic compounds for the first inorganic particles and the second inorganic particles may be selected independently as long as the basicity of the honeycomb unit 11 becomes higher than that of the coating layers 15. Preferably, however, the first inorganic particles include the same particles as those used for the second inorganic particles and different particles with higher basicity than that of the second inorganic particles. More specifically, the second inorganic particles preferably comprise alumina and the different particles with higher basicity than that of the second inorganic particles preferably comprise zirconia. In this case, the first inorganic particles preferably include between about 3 and about 30 wt % of zirconia. Limiting the content of zirconia between about 3 and about 30 wt % makes it easier to make the ratio of the amount of $CO_2$ desorbed of the honeycomb unit 11 to the amount of $CO_2$ desorbed of the coating layers 15 greater than or equal to about 1.01 and thereby makes it easier to effectively improve the SOx-occluding capability. If the content of zirconia is equal to or more than about 3 wt %, the difference in basicity between the coating layers 15 and the honeycomb unit 11 may not become insufficient and the S conversion efficiency may not be reduced. On the other hand, if the content of zirconia is equal to or less than about 30 wt %, the specific surface area of the honeycomb unit 11 may not become insufficient.

The average particle diameter of the first inorganic particles is preferably between about 0.1 and about 10 μm. If the average particle diameter of the first inorganic particles is equal to or more than about 0.1 μm, it may not be necessary to add a large amount of inorganic binder and as a result, it becomes easier to perform extrusion molding. If the average particle diameter of the first inorganic particles is equal to or less than about 10 μm, the effect of increasing the specific surface area of the honeycomb unit 11 may not become insufficient.

The average particle diameter of the second inorganic particles is preferably between about 0.1 and about 10 μm. If the average particle diameter of the second inorganic particles is equal to or more than about 0.1 μm, the second inorganic particles may not easily move into the partition walls and as a result, the effect of the coating layers 15 may not become insufficient. If the average particle diameter of the second inorganic particles is equal to or less than about 10 μm, the effect of increasing the specific surface area of the honeycomb unit 11 may not become insufficient.

The content of the first inorganic particles in the honeycomb unit 11 is preferably between about 30 and about 90 wt %, more preferably between about 40 and about 80 wt %, and especially preferably between about 50 and about 75 wt %. If the content of the first inorganic particles is equal to or more than about 30 wt %, the specific surface area of the honeycomb unit 11 may not become insufficient. On the other hand, if the content of the first inorganic particles is equal to or less than about 90 wt %, the strength of the honeycomb unit 11 may not become insufficient.

The thickness of the partition walls of the honeycomb unit 11 is preferably between about 0.05 and about 0.35 mm, more preferably between about 0.10 and about 0.30 mm, and especially preferably between about 0.15 and about 0.25 mm. If the thickness of the partition walls is equal to or more than about 0.05 mm, the strength of the honeycomb unit 11 may not become insufficient. If the thickness of the partition walls is equal to or less than about 0.35 mm, the exhaust gas can easily penetrate into the partition walls and as a result, the SOx-occluding capability may not become insufficient.

The thickness of the coating layers 15 is preferably between about 0.01 and about 0.15 mm. If the thickness of the coating layers 15 is equal to or more than about 0.01 mm, the effect of the coating layers 15 may not become insufficient. If the thickness of the coating layers is equal to or less than about 0.15 mm, the exhaust gas can easily penetrate into the partition walls and as a result, the SOx-occluding capability may not become insufficient.

Any inorganic binder may be used for the honeycomb unit 11. For example, solid contents of alumina sol, silica sol, titania sol, water glass, sepiolite, attapulgite, and the like may be used individually or in combination.

The content of the inorganic binder in the honeycomb unit 11 is preferably between about 5 and about 50 wt %, more preferably between about 10 and about 40 wt %, and especially preferably between about 15 and about 35 wt %. If the content of the inorganic binder is equal to or more than about 5 wt %, the strength of the honeycomb unit 11 may not become insufficient. If the content of the inorganic fiber is equal to or less than about 50 wt %, it may not become difficult to perform molding of the honeycomb unit 11.

Preferably, the honeycomb unit 11 further includes inorganic fibers. Including inorganic fibers makes it easier to improve the strength of the honeycomb unit 11.

For the inorganic fibers, any material that can improve the strength of the honeycomb unit 11 may be used. For example, alumina, silica, silicon carbide, silica alumina, glass, potassium titanate, aluminum borate, and the like may be used individually or in combination.

The aspect ratio of the inorganic fibers is preferably between about 2 and about 1000, more preferably between about 5 and about 800, and especially preferably between about 10 and about 500. If the aspect ratio of the inorganic fibers is equal to or more than about 2, the effect of improving the strength of the honeycomb unit 11 may not become insufficient. On the other hand, if the aspect ratio of the inorganic fibers is equal to or less than about 1000, the inorganic fibers may not cause clogging during molding, such as extrusion molding, of the honeycomb unit 11, or the inorganic fibers may not be broken during molding and the effect of improving the strength of the honeycomb unit 11 may not become insufficient.

The content of the inorganic fibers in the honeycomb unit 11 is preferably between about 3 and about 50 wt %, more preferably between about 5 and about 40 wt %, and especially preferably between about 8 and about 30 wt %. If the content of the inorganic fibers is equal to or more than about 3 wt %, the effect of improving the strength of the honeycomb unit 11 may not become insufficient. If the content of the inorganic fibers is equal to or less than about 50 wt %, the specific surface area of the honeycomb unit 11 may not become insufficient.

The area of a cross section of the honeycomb unit 11 which cross section is orthogonal to the longitudinal direction, i.e., orthogonal to the through holes 12, is preferably between about 5 and about 50 cm$^2$. If the cross-sectional area of the honeycomb unit is equal to or more than about 5 cm$^2$, the specific surface area of the honeycomb structure 10 may not become insufficient and the pressure loss may not increase. If the cross-sectional area of the honeycomb unit is equal to or less than about 50 cm$^2$, the strength of the honeycomb unit 11 against thermal stress may not become insufficient.

The number of the through holes 12 per 1 cm$^2$ of a cross section orthogonal to the longitudinal direction of the honeycomb unit 11 is preferably between about 15.5 and about 186, more preferably between about 46.5 and about 170.5, and especially preferably between about 62.0 and about 155. If the number of the through holes 12 per 1 cm$^2$ of the honeycomb unit 11 is equal to or more than about 15.5, the strength of the honeycomb unit 11 may not become insufficient. If the number of the through holes 12 per 1 cm$^2$ of the honeycomb unit 11 is equal to or less than about 186, the pressure loss of the honeycomb unit 11 may not increase.

The thickness of the adhesive layers 13 for bonding the honeycomb units 11 is preferably between about 0.5 and about 2 mm. If the thickness of the adhesive layers 13 is equal to or more than about 0.5 mm, the bonding strength may not become insufficient. If the thickness of the adhesive layers 13 is equal to or less than about 2 mm, the specific surface area of the honeycomb structure 10 may not become insufficient and the pressure loss of the honeycomb structure 10 may not increase.

The thickness of the outer peripheral coating layer 14 is preferably between about 0.1 and about 3 mm. If the thickness of the outer peripheral coating layer 14 is equal to or more than about 0.1 mm, the effect of improving the strength of the honeycomb structure 10 may not become insufficient. If the thickness of the outer peripheral coating layer 14 is equal to or less than about 3 mm, the specific surface area of the honeycomb structure 10 may not become insufficient.

Although the honeycomb structure 10 of this embodiment is shaped like a cylinder, a honeycomb structure according to embodiments of the present invention may have any other shape such as a rectangular pillar or a cylindroid.

Also, although the honeycomb unit 11 of this embodiment is shaped like a square pillar, a honeycomb unit according to embodiments of the present invention may have any other shape, such as a hexagonal pillar, that is suitable to bond multiple honeycomb units together.

Further, although each of the through holes 12 of this embodiment is shaped like a square pillar, a through hole according to embodiments of the present invention may have any other shape such as a triangular pillar or a hexagonal pillar.

The partition walls on which the coating layers 15 are formed may also support a noble metal catalyst. The noble metal catalyst may be supported on the surfaces of the partition walls, in the coating layers 15, or on the surfaces of the coating layers 15. As the noble metal catalyst, any noble metal that can oxidize $SO_2$ to $SO_3$ may be used. For example, platinum, palladium, rhodium, and the like may be used individually or in combination.

An exemplary method of manufacturing the honeycomb structure 10 according to an embodiment of the present invention is described below. First, raw honeycomb molded bodies each having parallel through holes separated by partition walls and extending in the longitudinal direction are prepared by, for example, extrusion-molding a raw material paste that includes the first SOx-occluding agent, the first inorganic particles, the inorganic binder, and, if necessary, the inorganic fibers. With the above raw honeycomb molded bodies, it is easier to manufacture the honeycomb units 11 having enough strength even with a low firing temperature.

As the inorganic binder, for example, one of or a combination of alumina sol, silica sol, titania sol, water glass, sepiolite, attapulgite, and the like may be used.

The raw material paste may also include an organic binder, a dispersion medium, and/or a molding aid as necessary.

As the organic binder, for example, any one of or a combination of methylcellulose, carboxymethylcellulose, hydroxyethylcellulose, polyethylene glycol, phenolic resin, epoxy resin, and the like may be used. The amount of the organic binder is preferably between 1 and 10% of the total weight of the inorganic particles, the inorganic fibers, and the inorganic binder.

As the dispersion medium, for example, any one of or combination of water, organic solvents such as benzene, alcohol such as methanol, and the like may be used.

As the molding aid, for example, any one of or combination of ethylene glycol, dextrin, fatty acid, fatty acid soap, polyalcohol, and the like may be used.

The raw material paste is preferably prepared by mixing the raw materials, for example, using a mixer, an attritor, or the like and by kneading the mixture, for example, using a kneader or the like.

Next, the manufactured honeycomb molded bodies are dried using a drying apparatus such as a microwave drying apparatus, a hot-air drying apparatus, a dielectric drying apparatus, a reduced pressure drying apparatus, a vacuum drying apparatus, or a freeze drying apparatus.

The dried honeycomb molded bodies are degreased. Although degreasing conditions may be determined freely depending on the kinds and amounts of organic materials in the honeycomb molded bodies, degreasing is preferably performed at about 400° C. for about two hours.

The degreased honeycomb molded bodies are fired to manufacture the honeycomb units 11. The firing temperature is preferably between about 600 and about 1200° C. and more preferably between about 600 and about 1000° C. If the firing temperature is equal to or more than about 600° C., sintering can proceed smoothly and the strength of the honeycomb unit 11 may not become insufficient. If the firing temperature is equal to or less than about 1200° C., sintering may not proceed excessively and the specific surface area of the honeycomb unit 11 may not become insufficient.

An adhesive layer paste is applied to the outer surfaces of the honeycomb units 11 and the honeycomb units 11 are bonded together. Then, the adhesive layer paste is solidified by drying to manufacture an aggregate of the honeycomb units 11. The aggregate of the honeycomb units 11 may be cut and ground to shape it into a cylinder. Alternatively, a cylindrical aggregate of the honeycomb units 11 may be manufactured by bonding honeycomb units 11 with fan-shaped and square-shaped cross sections.

Examples of the adhesive layer paste include, but are not limited to, a mixture of an inorganic binder and inorganic particles, a mixture of an inorganic binder and inorganic fibers, and a mixture of an inorganic binder, inorganic particles, inorganic fibers, and the like.

The adhesive layer paste may also include an organic binder. As the organic binder, for example, any one of or combination of polyvinyl alcohol, methylcellulose, ethyl cellulose, carboxymethylcellulose, and the like may be used.

Then, an outer peripheral coating layer paste is applied to the outer surface of the cylindrical aggregate of the honeycomb units 11 and is solidified by drying. The outer peripheral coating layer paste may contain the same or different materials as those of the adhesive layer paste. Also, the composition of the outer peripheral coating layer paste may be the same as that of the adhesive layer paste.

After the outer peripheral coating layer paste is applied, the aggregate of the honeycomb units 11 is solidified by drying to obtain the honeycomb structure 10. In this step, the honeycomb structure 10 is preferably degreased if an organic binder is contained in the adhesive layer paste and/or the outer peripheral coating layer paste. Although degreasing conditions may be determined freely depending on the kind and amount of the organic material, degreasing is preferably performed at 700° C. for two hours.

Next, the coating layers 15 are formed on the surfaces of the partition walls. The coating layers 15 may be formed, for example, by impregnation.

Further, if needed, a noble metal catalyst is deposited on the partition walls on which the coating layers 15 are formed. The noble metal catalyst may be deposited, for example, by impregnation.

Figure 2:
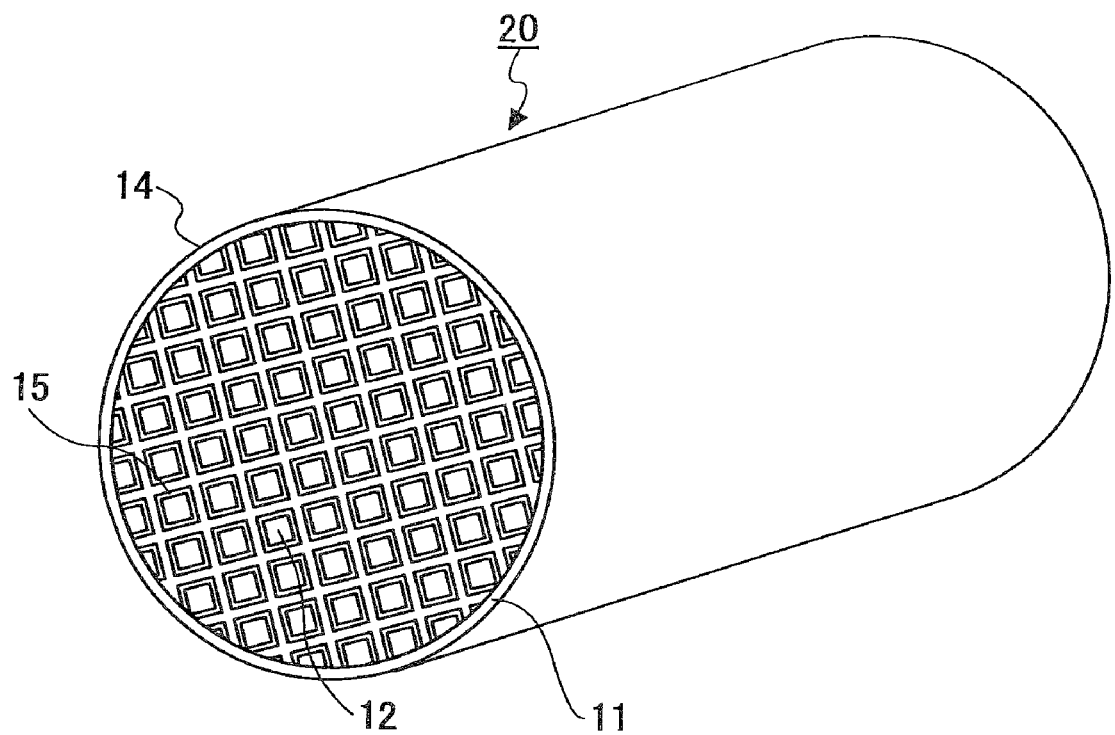
FIG. 2 is a perspective view of a honeycomb structure according to another embodiment of the present invention.

FIG. 2 is a perspective view of a honeycomb structure according to another embodiment of the present invention. Different from the honeycomb structure 10, a honeycomb structure 20 shown in FIG. 2 comprises one honeycomb unit 11 having parallel through holes 12 separated by partition walls and extending in the longitudinal direction. Other configurations of the honeycomb structure 20 are substantially the same as those of the honeycomb structure 10.

In a honeycomb structure according to embodiments of the present invention, an outer peripheral coating layer may or may not be formed.

EXAMPLES

Example 1

A raw material paste was prepared by mixing and kneading 440 g of magnesium oxide used as a SOx-occluding agent; 1750 g of γ-alumina with an average particle diameter of 2 μm and 50 g of zirconia with an average particle diameter of 2 μm used as inorganic particles; 680 g of alumina fibers with an average fiber diameter of 6 μm and an average fiber length of 100 μm used as inorganic fibers; 2600 g of alumina sol with a solid content of 20 wt % used as an inorganic binder; and 195 g of methylcellulose used as an organic binder. The raw material paste was extrusion-molded using an extruder to obtain raw honeycomb molded bodies. The honeycomb molded bodies were dried using a microwave drying apparatus and a hot-air drying apparatus and then degreased at 400° C. for two hours. Then, the honeycomb molded bodies were fired at 700° C. for two hours. As a result, square-pillar honeycomb units with a height of 35 mm, a width of 35 mm, and a length of 68 mm were obtained. The number of through holes per 1 cm$^2$ of a cross section orthogonal to the longitudinal direction of the honeycomb unit was 93, and the thickness of the partition walls was 0.2 mm.

Next, a heat-resistant adhesive layer paste was prepared by mixing and kneading 26 wt % of γ-alumina with an average particle diameter of 2 μm; 37 wt % of alumina fibers with an average fiber diameter of 0.5 μm and an average fiber length of 15 μm; 31.5 wt % of alumina sol with a solid content of 20 wt % used as an inorganic binder; 0.5 wt % of carboxymethylcellulose used as an organic binder, and 5 wt % of water.

The prepared adhesive layer paste was applied to the surfaces of the honeycomb units to a thickness of 1 mm. Then, the honeycomb units were bonded together and the adhesive layer paste was solidified by drying at 120° C. to form an aggregate of the honeycomb units. The aggregate of the honeycomb units was shaped into a cylinder by cutting it with a diamond cutter such that its cross section orthogonal to the longitudinal direction became substantially point-symmetric. Next, the adhesive layer paste was applied to the outer surface of the shaped aggregate of the honeycomb units to form an outer peripheral coating layer with a thickness of 0.5 mm, and was solidified by drying at 120° C. using a microwave drying apparatus and a hot-air drying apparatus. Then, the aggregate was degreased at 400° C. for two hours. As a result, a cylindrical honeycomb structure with a diameter of 138 mm and a length of 68 mm (with a volume of 1 L) was obtained.

The obtained honeycomb structure was impregnated with a coating layer dispersion liquid where magnesium oxide and γ-alumina with an average particle diameter of 2 μm were dispersed and was kept at 600° C. for one hour to form coating layers. The contents of magnesium oxide in the partition walls and the coating layers were 1.0 mol/L and 1.5 mol/L, respectively.

Further, the honeycomb structure was impregnated with a platinum nitrate solution and then kept at 600° C. for one hour to support 3 g/L of platinum used as a noble metal catalyst.

Example 2

A honeycomb structure supporting platinum was manufactured in substantially the same manner as in Example 1 except that the amounts of γ-alumina and zirconia used for the raw material paste were changed, respectively, to 1700 g and 100 g.

Example 3

A honeycomb structure supporting platinum was manufactured in substantially the same manner as in Example 1 except that the amounts of γ-alumina and zirconia used for the raw material paste were changed, respectively, to 1500 g and 300 g.

Example 4

A honeycomb structure supporting platinum was manufactured in substantially the same manner as in Example 3 except that the raw material paste was prepared using calcium carbonate instead of zirconia.

Example 5

A honeycomb structure supporting platinum was manufactured in substantially the same manner as in Example 1 except that the amounts of γ-alumina and zirconia used for the raw material paste were changed, respectively, to 1300 g and 500 g.

Example 6

A honeycomb structure supporting platinum was manufactured in substantially the same manner as in Example 1 except that the amounts of γ-alumina and zirconia used for the raw material paste were changed, respectively, to 1000 g and 800 g.

Comparative Example 1

A honeycomb structure supporting platinum was manufactured in substantially the same manner as in Example 1 except that the amounts of γ-alumina and zirconia used for the raw material paste were changed, respectively, to 1800 g and 0 g.

Comparative Example 2

A honeycomb structure supporting platinum was manufactured in substantially the same manner as in Example 1 except that the amounts of γ-alumina and zirconia used for the raw material paste were changed, respectively, to 1800 g and 0 g and the coating layer dispersion liquid was prepared using zirconia instead of γ-alumina.

Comparative Example 3

A honeycomb structure supporting platinum was manufactured in substantially the same manner as in Example 1 except that the amounts of γ-alumina and zirconia used for the raw material paste were changed, respectively, to 1500 g and 300 g and the coating layer dispersion liquid was prepared using zirconia instead of γ-alumina.

Comparative Example 4

A honeycomb structure supporting platinum was manufactured in substantially the same manner as in Example 1 except that the amounts of γ-alumina and zirconia used for the raw material paste were changed, respectively, to 1300 g and 500 g and the coating layer dispersion liquid was prepared using zirconia instead of γ-alumina.

[Measurement of Amounts of $CO_2$ Desorbed]

Using the automatic temperature programmed desorption spectrometer TPD-1-ATw (BEL Japan, Inc.), 0.05 g of each sample (each of the dried powders of honeycomb units and coating layers manufactured in Examples and Comparative Examples) was heated in a vacuum at a rate of 10° C./min up to 300° C., and was left for 60 minutes. Next, after the sample was cooled to 100° C. and put into a steady state, $CO_2$ was introduced for 30 minutes so as to be adsorbed on the sample. With the temperature maintained at 100° C., $CO_2$ was evacuated and the sample was kept in a vacuum for 30 minutes. Then, the sample was heated at a rate of 10° C./min up to 600° C. while introducing helium at a flow rate of 50 mL/min. During this step, the cumulative amount of $CO_2$ desorbed into the helium was measured. To detect $CO_2$, a quadrupole mass spectrometer was used. The measurement results for all of the samples are shown in table 1.

[Measurement of Leakage of SOx]

While feeding a simulated gas with a temperature of 400° C. into the honeycomb structure at a space velocity (SV) of 50000/hr until 500 g of SOx was occluded, the concentration of SOx in the gas flowing out of the honeycomb structure was measured (with a detection limit of 0.1 ppm) using MEXA-7100D and MEXA-1170SX (HORIBA Ltd.). The simulated gas was composed of nitrogen (balance), carbon dioxide (10 vol %), oxygen (10 vol %), nitrogen monoxide (200 ppm), carbon monoxide (0 vol %), hydrocarbon (200 ppm), and sulfur dioxide (125 ppm).

TABLE 1

|  | Amount of $CO_2$ desorbed [μmol/g]: honeycomb unit | Amount of $CO_2$ desorbed [μmol/g]: coating layer | Content of zirconia (%) (in inorganic particles) | Ratio of amount of $CO_2$ desorbed (honeycomb unit/coating layer) | S conversion efficiency (%) |
|---|---|---|---|---|---|
| EXAMPLE 1 | 64.4 | 64.0 | 2.8 | 1.006 | 91 |
| EXAMPLE 2 | 64.9 | 64.0 | 5.6 | 1.014 | 95 |
| EXAMPLE 3 | 66.7 | 64.0 | 16.7 | 1.042 | 98 |
| EXAMPLE 4 | 66.7 | 64.0 | 16.7 | 1.042 | 98 |
| EXAMPLE 5 | 68.4 | 64.0 | 27.8 | 1.069 | 98 |
| EXAMPLE 6 | 71.1 | 64.0 | 44.4 | 1.111 | 91 |
| COMPARATIVE EXAMPLE 1 | 64.0 | 64.0 | 0.0 | 1.000 | 88 |
| COMPARATIVE EXAMPLE 2 | 64.0 | 80.0 | 0.0 | 0.800 | 72 |
| COMPARATIVE EXAMPLE 3 | 66.7 | 80.0 | 16.7 | 0.834 | 73 |
| COMPARATIVE EXAMPLE 4 | 68.4 | 80.0 | 27.8 | 0.855 | 73 |

Because the content of sulfur dioxide in the simulated gas is 125 ppm, if the concentration of SOx in the gas flowing out of the honeycomb structure is 12.5 ppm, it indicates that the conversion efficiency is about 90%.

Thus, the honeycomb structures of Examples 1 through 6, where the basicity of the honeycomb units is higher than that of the coating layers, exhibited excellent SOx-occluding capability. The results in Table 1 also indicate that the S conversion efficiency is particularly high when the ratio of the amount of $CO_2$ desorbed (honeycomb unit/coating layer) is between 1.01 and 1.07 and this range can be achieved when the content of zirconia in the inorganic particles is greater than or equal to 3%. Further, with the content of zirconia less than or equal to 30%, it is possible to prevent reduction in the S conversion efficiency resulting from the decrease in the specific surface area.

The present invention is not limited to the specifically disclosed embodiments, and variations and modifications may be made without departing from the scope of the present invention.

What is claimed is:

1. A honeycomb structure, comprising:
   at least one honeycomb unit having parallel through holes separated by partition walls and extending in the longitudinal direction, the honeycomb unit being prepared by extrusion-molding and firing a material including a first SOx-occluding agent, first inorganic particles, and an inorganic binder so as to include the first SOx-occluding agent within the at least one honeycomb unit; and
   coating layers formed on the partition walls and including a second SOx-occluding agent and second inorganic particles,
   wherein the basicity of the fired material forming the honeycomb unit is higher than that of the coating layers,
   the first inorganic particles include the same particles as those used for the second inorganic particles and different particles with higher basicity than that of the second inorganic particles,
   the second inorganic particles comprise alumina,
   the different particles with higher basicity than that of the second inorganic particles comprise zirconia, and
   the first inorganic particles include between about 3 and about 30 wt % of zirconia.

2. The honeycomb structure as claimed in claim 1, wherein each of the first SOx-occluding agent and the second SOx-occluding agent independently includes at least one of an alkali metal and an alkaline-earth metal.

3. The honeycomb structure as claimed in claim 2, wherein each of the first SOx-occluding agent and the second SOx-occluding agent independently includes at least one of potassium, magnesium, and barium.

4. The honeycomb structure as claimed in claim 1, wherein the partition walls include between about 1.0 mol/L and about 2.5 mol/L of the first SOx-occluding agent.

5. The honeycomb structure as claimed in claim 1, wherein average particle diameters of the first inorganic particles and the second inorganic particles are independently between about 0.1 and about 10 μm.

6. The honeycomb structure as claimed in claim 1, wherein the content of the first inorganic particles is between about 30 and about 90 wt %.

7. The honeycomb structure as claimed in claim 1, wherein the inorganic binder includes at least one of solid contents of alumina sol, silica sol, titania sol, water glass, sepiolite, and attapulgite.

8. The honeycomb structure as claimed in claim 1, wherein the content of the inorganic binder is between about 5 and about 50 wt %.

9. The honeycomb structure as claimed in claim 1, wherein the honeycomb unit further includes inorganic fibers.

10. The honeycomb structure as claimed in claim 9, wherein the inorganic fibers comprise at least one of alumina, silica, silicon carbide, silica alumina, glass, potassium titanate, and aluminum borate.

11. The honeycomb structure as claimed in claim 9, wherein the aspect ratio of the inorganic fibers is between about 2 and about 1000.

12. The honeycomb structure as claimed in claim 9, wherein the content of the inorganic fibers is between about 3 and about 50 wt %.

13. The honeycomb structure as claimed in claim 1, wherein the thickness of the partition walls of the honeycomb unit is between about 0.05 and about 0.35 mm.

14. The honeycomb structure as claimed in claim 1, wherein the number of the through holes per 1 $cm^2$ of a cross section orthogonal to the longitudinal direction of the honeycomb unit is between about 15.5 and about 186.

15. The honeycomb structure as claimed in claim 1, wherein the honeycomb structure comprises a plurality of honeycomb units that are bonded together by interposing adhesive layers.

16. The honeycomb structure as claimed in claim 15, wherein the area of a cross section orthogonal to the longitudinal direction of the honeycomb unit is between about 5 and about 50 $cm^2$.

17. The honeycomb structure as claimed in claim 1, wherein the partition walls support a noble metal catalyst.

18. The honeycomb structure as claimed in claim 17, wherein the noble metal catalyst comprises at least one of platinum, palladium, and rhodium.

19. The honeycomb structure as claimed in claim 17, wherein the noble metal catalyst is supported on surfaces of the partition walls, in the coating layers, or on surfaces of the coating layers.

20. The honeycomb structure as claimed in claim 1, wherein an outer surface of the honeycomb structure is covered by an outer peripheral coating layer.

21. The honeycomb structure as claimed in claim 1, wherein the honeycomb structure comprises a single honeycomb unit.

* * * * *